United States Patent
Isaksson et al.

(10) Patent No.: US 9,323,243 B2
(45) Date of Patent: Apr. 26, 2016

(54) METHOD AND SENSOR NODE NETWORK INTERFACE SYSTEM FOR WIRELESS CONTROL OF AN INDUSTRIAL PROCESS

(71) Applicant: ABB RESEARCH LTD, Zürich (CH)

(72) Inventors: Alf Isaksson, Västerås (SE); Johan Åkerberg, Västerås (SE); Krister Landernäs, Hallstahammar (SE)

(73) Assignee: ABB RESEARCH LTD, Zürich (CH)

( * ) Notice: Subject to any disclaimer, the term of this patent is extended or adjusted under 35 U.S.C. 154(b) by 15 days.

(21) Appl. No.: 14/408,018

(22) PCT Filed: Jun. 28, 2013

(86) PCT No.: PCT/EP2013/063696
§ 371 (c)(1),
(2) Date: Dec. 15, 2014

(87) PCT Pub. No.: WO2014/009178
PCT Pub. Date: Jan. 16, 2014

(65) Prior Publication Data
US 2015/0177733 A1    Jun. 25, 2015

(30) Foreign Application Priority Data

Jul. 12, 2012 (EP) .................................. 12176220

(51) Int. Cl.
*G05B 19/418*       (2006.01)
*H04Q 9/00*         (2006.01)
(Continued)

(52) U.S. Cl.
CPC .......... *G05B 19/4185* (2013.01); *H04L 67/125* (2013.01); *H04Q 9/00* (2013.01);
(Continued)

(58) Field of Classification Search
CPC ............ G05B 19/4185; H04L 67/125; H04W 72/0446; H04W 88/16; H04W 72/042; H04W 84/18; H04Q 9/00; H04Q 2209/43
See application file for complete search history.

(56) References Cited

U.S. PATENT DOCUMENTS 4,974,164 A * 11/1990 Lewis .................... G01B 11/02
                                                          33/1 L
5,177,695 A    1/1993 Sung et al.
(Continued)

FOREIGN PATENT DOCUMENTS

EP          1 921 527 A2    5/2008
EP          2 042 950 A1    4/2009
(Continued)

*Primary Examiner* — Mohammad Ali
*Assistant Examiner* — Nathan L Laughlin
(74) *Attorney, Agent, or Firm* — Birch, Stewart, Kolasch & Birch, LLP

(57) ABSTRACT

A method of allocating time slots for sensor node sample transmission from sensor nodes in a wireless sensor node network which forms part of a control system for controlling an industrial process includes receiving a sample from a first sensor node in a first time slot of a superframe, which first sample has a value outside an accepted range of values, obtaining an identification of a second time slot of the superframe in which second time slot the first sensor node is to send a further sample in a subsequent superframe, and providing instructions to the first sensor node to send the further sample in the second time slot of a subsequent superframe. A computer program product and a sensor node network interface system are also disclosed herein.

20 Claims, 3 Drawing Sheets

(51) Int. Cl.
  *H04W 72/04* (2009.01)
  *H04L 29/08* (2006.01)
  *H04W 84/18* (2009.01)
  *H04W 88/16* (2009.01)

(52) U.S. Cl.
  CPC ....... *H04W72/0446* (2013.01); *H04Q 2209/43* (2013.01); *H04W 72/042* (2013.01); *H04W 84/18* (2013.01); *H04W 88/16* (2013.01)

(56) References Cited

U.S. PATENT DOCUMENTS

| | | |
|---|---|---|
| 7,016,750 B2 | 3/2006 | Steinkirchner et al. |
| 7,058,467 B2 | 6/2006 | Tanaka et al. |
| 7,062,405 B2 | 6/2006 | Völkel |
| 2004/0213589 A1* | 10/2004 | Barbera ............. G03G 15/6561 399/16 |
| 2011/0092164 A1* | 4/2011 | Spanhake ................ H04Q 9/00 455/67.11 |
| 2011/0211461 A1* | 9/2011 | Bahr ..................... H04L 1/1887 370/245 |
| 2012/0020336 A1* | 1/2012 | Bahr ..................... H04W 74/02 370/336 |
| 2012/0197622 A1* | 8/2012 | Jain ..................... G06F 19/3418 703/11 |
| 2012/0245890 A1* | 9/2012 | Wark .................... G01D 15/00 702/181 |

FOREIGN PATENT DOCUMENTS

| | | |
|---|---|---|
| EP | 2 227 063 A1 | 9/2010 |
| WO | WO 2011/160694 A1 | 12/2011 |

\* cited by examiner

# METHOD AND SENSOR NODE NETWORK INTERFACE SYSTEM FOR WIRELESS CONTROL OF AN INDUSTRIAL PROCESS

TECHNICAL FIELD

The present disclosure generally relates to wireless control of an industrial process and in particular to a method and sensor node network interface system for sending samples in a time slotted protocol utilised in wireless industrial control.

BACKGROUND

As in many other areas of technology, wireless communication is becoming increasingly popular also in industrial process control. Some of the main standards for wireless communication in wireless control of an industrial process utilise protocols that are time-slotted. In time-slotted protocols each superframe comprises a plurality of time slots, wherein each sensor is allotted a specific time slot for wirelessly sending measured process variable data for example to a gateway. Time-slotted wireless protocols used in industrial control, such as WirelessHART and ISA 100, have a predefined number of time slots per superframe. In WirelessHART each superframe may for example be 1000 ms, of which 500 ms may be dedicated to sensor time slots while the remaining 500 ms is dedicated to administration, e.g. for broadcasting information to the sensors. Each time slot dedicated to the sensors may for example be 10 ms. Thus, according to this example only 50 time slots per superframe are dedicated to sensor measurements, giving a maximum of 50 sensors to communicate with a gateway in one superframe. However, since it is generally desirable that most sensors send measurement data several times in a superframe for robustness the number of sensors than can be used in an industrial control sensor node network interface system with each gateway is further limited. Typically several gateways have to be provided for large sensor node networks, with each gateway having a plurality of sensors associated with it. If several gateways are used the gateways should be synchronized, especially if one controller is associated with several gateways.

SUMMARY

In view of the above, a general object of the present disclosure is to provide a method and a sensor node network interface system which allows for adaptive selection of time slots for sensor samples in a superframe.

Hence, according to a first aspect of the present disclosure there is provided a method of allocating time slots for sensor node sample transmission from sensor nodes in a wireless sensor node network, which wireless sensor node network forms part of a control system for controlling an industrial process, wherein the method comprises: receiving a sample from a first sensor node in a first time slot of a superframe, which first sample has a value outside an accepted range of values; obtaining an identification of a second time slot of the superframe in which second time slot the first sensor node is to send a further sample in a subsequent superframe; and providing instructions to the first sensor node to send the further sample in the second time slot of a subsequent superframe.

It may hence be possible to utilise more sensor nodes in a sensor node network per gateway, as the sensor node(s) which measures a process variable that deviates considerable from a setpoint value will be able to send more samples in time slots allocated for this purpose. Beneficially, a less complicated wireless control system may be provided at a lower cost.

One embodiment comprises receiving a sample from a second sensor node in the second time slot of the superframe, which sample has a value within a range of accepted sample values, and providing instructions to the second sensor node not to send any sample in the second time slot of a subsequent superframe.

One embodiment comprises, prior to providing instructions to the first sensor node, receiving a confirmation from the second sensor node that it will not send any sample in the second time slot.

According to one embodiment the step of providing instructions to the first sensor node to send the further sample in the second time slot is provided in a portion of a superframe dedicated to send instructions to all of the sensor nodes in the sensor node network.

According to one embodiment, the step of providing instructions to the second sensor node not to send any sample in the second time slot of a subsequent superframe is provided in the portion of a superframe dedicated to send instructions to all of the sensor nodes in the sensor node network of the same superframe in which instructions are provided to the first sensor node to send the further sample in the second time slot.

One embodiment comprises, after the step of providing instructions to the first sensor node, instructing the first sensor node to send the sample value of the second time slot in a third time slot of a subsequent superframe instead of the second time slot.

According to one embodiment the second time slot is an empty time slot.

According to a second aspect of the present disclosure there is provided a computer program product comprising computer-executable components for causing a device to perform the steps recited in the first aspect when the computer-executable components are run on a processor included in the device.

According to a third aspect of the present disclosure there is provided a sensor node network interface system for allocating time slots for sensor node sample transmission from sensor nodes in a wireless sensor node network forming part of a control system for controlling an industrial process, wherein the sensor node network interface system is arranged to: receive a sample from a first sensor node in a first time slot of a superframe, which first sample has a value outside an accepted range of values, obtain an identification of a second time slot of the superframe in which second time slot the first sensor node is to send a further sample, and provide instructions to the first sensor node to send the further sample in the second time slot of a subsequent superframe.

According to one embodiment the sensor node network interface system is arranged to receive a sample from a second sensor node in the second time slot, which sample has a value within a range of accepted sample values, wherein the sensor node network interface system is arranged to provide instructions to the second sensor node not to send any sample in the second time slot of a subsequent superframe.

According to one embodiment the sensor node network interface system is arranged to receiving a confirmation from the second sensor node that it will not send any sample in the second time slot of a subsequent superframe prior to providing instructions to the first sensor node.

According to one embodiment the sensor node network interface system is arranged to provide the instructions to the first sensor node to send the further sample in the second time slot in a portion of a superframe dedicated to send instructions to all of the sensor nodes in the sensor node network.

According to one embodiment the sensor node network interface system is arranged to instruct the first sensor node to send the further sample of the second time slot in a third time slot of the super frame instead of the second time slot.

According to one embodiment the second time slot is an empty time slot.

Generally, all terms used in the claims are to be interpreted according to their ordinary meaning in the technical field, unless explicitly defined otherwise herein. All references to a/an/the element, apparatus, component, means, etc. are to be interpreted openly as referring to at least one instance of the element, apparatus, component, means, etc., unless explicitly stated otherwise. Moreover, any step in a method need not necessarily have to be carried out in the presented order, unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

The present disclosure relates to a sensor node network interface system and methods for a control system of an industrial process. An industrial process is to be understood to mean a procedure that involves chemical, electrical or mechanical steps to aid in manufacturing, production, power generation, fabrication, or refining. Examples of such industrial processes are processes relating to the refining of oil and gas, the petrochemical industry, power generation, power transmission, power distribution, metals and mining, chemical industry, pulp and paper, or automation in e.g. the manufacturing industry or food industry. It is to be noted that the present inventive concept can be utilised for maintenance of many different types of industrial processes, with only a few examples having been given above.

Figure 1:
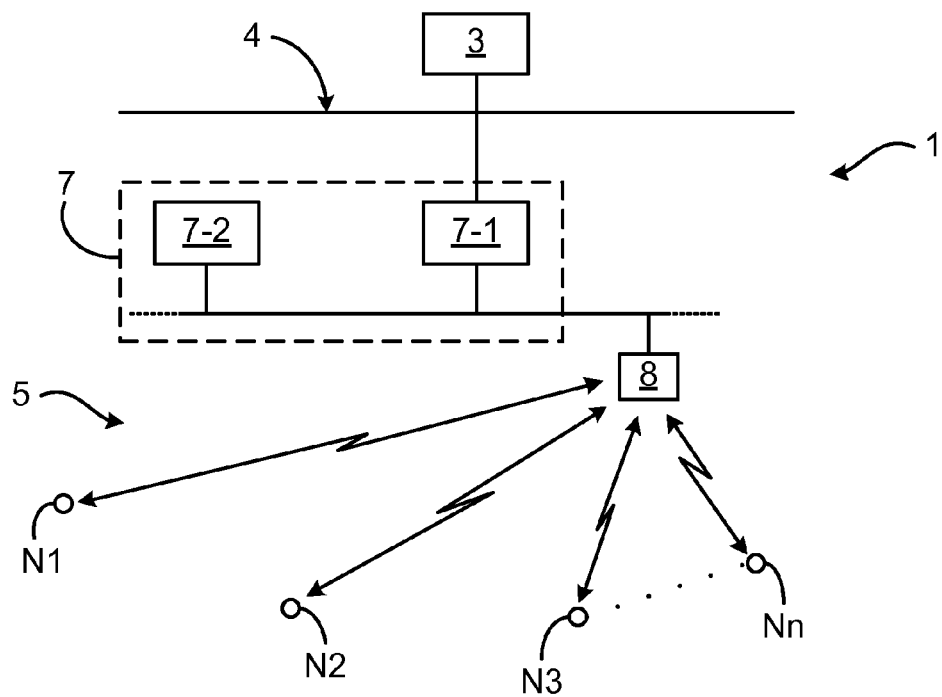
FIG. 1 is a schematic diagram of a control system comprising a sensor node network interface system.

FIG. 1 is an example of control system 1 for controlling an industrial process. The control system 1 comprises a controller network 4 comprising a controller 3, a sensor node network 5 comprising sensor nodes N1, N2, N3, . . . Nn, a sensor node network interface system 7 which is an interface between the controller network 4 and the sensor node network 5, and an access point 8 which enables wireless communication between the sensor nodes N1, N2, N3, . . . Nn and the sensor node network interface system 7.

The sensor node network interface system 7 comprises a gateway 7-1 and a network manager 7-2.

The gateway 7-1 is arranged to communicate with the sensor nodes N1, N2, N3, . . . , Nn of the sensor node network 5. The communication between the gateway 7-1 and the sensor nodes N1, N2, N3, . . . , Nn is provided by means of a time-slotted protocol. As already mentioned, examples of such time-slotted protocols are WirelessHART, and ISA 100.

Figure 2:
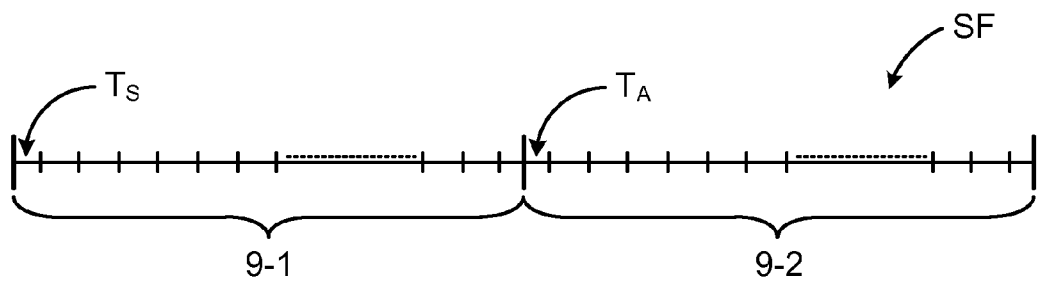
FIG. 2 depicts a schematic example of a superframe of a wireless communications protocol used in the control system in FIG. 1.

FIG. 2 schematically shows an example of a superframe SF of a time-slotted protocol for wireless industrial control. The superframe SF has a first portion 9-1 of time slots $T_s$ dedicated to samples from sensor nodes N1, N2, N3, . . . , Nn. In each time slot $T_s$ of the first portion 9-1 a sensor node N1, N2, N3, . . . , Nn may transmit one or more samples of a process variable associated with that sensor node N1, N2, N3, . . . , Nn. The superframe SF has a second portion 9-2 of time slots $T_a$ dedicated to administrative communication with the sensor nodes N1, N2, N3, . . . , Nn, e.g. administrative broadcasts. The gateway 7-1 may thereby transmit instructions and/or information to the sensor nodes in the time slots $T_a$ of the second portion 9-1 of each superframe SF.

Returning to FIG. 1, the gateway 7-1 is arranged to receive samples of process variables sent by the sensor nodes N1, N2, N3, . . . , Nn and to provide the samples to the controller 3. The controller 3 is arranged to control process variables associated with the sensor nodes N1, N2, N3, . . . , Nn based on control errors determined by the difference between respective setpoint values and the samples received by controller 3. Typically each sensor node N1, N2, N3, . . . , Nn is associated with a respective control loop.

The gateway 7-1 is according to one example of the sensor node network interface system 7 arranged to receive data from the controller 3, which data is to be further sent in the form of information or instructions to the sensor node network 7. Such data received by the gateway 7-1 may for example relate to information concerning the need of a higher sample rate from a sensor node N1, N2, N3, . . . , Nn. This may for instance be the case when a sensor node provides samples to the gateway 7-1, and thus to the controller 3, with values outside an accepted range of values, e.g. values that deviate from a setpoint value more than a predetermined threshold value. Reasons for sample values being outside an accepted range of values for a specific process variable are for example when control loop is in a transient or if an event has occurred and the associated process variable must be actively controlled. Alternatively, or additionally, the network manager may be arranged to determine whether a sample has a value outside an accepted range based on the samples provided by the sensor nodes N1, N2, N3, . . . , Nn.

The network manager 7-2 is arranged to allocate time slots of the first portion 9-1 dedicated to sensor node samples to sensor nodes if for example a sample in a time slot $T_s$ is determined to be outside an accepted range of values. To this end, the network manager 7-2 is hence arranged to provide a form of active scheduling of sensor node transmissions in the time slots $T_s$ of the first portion 9-1 of the superframe SF. The network manager is according to one embodiment included in the gateway e.g. as software. Alternatively, the network manager may be a physically separate device from the gateway.

The gateway 7-1 is arranged to provide instructions and information to the sensor nodes N1, N2, N3, . . . , Nn concerning the allocation of one or more time slots $T_s$ of the first portion 9-1 of a superframe SF.

In the example in FIG. 1, the sensor nodes N1, N2, N3, . . . , Nn in network 5 are arranged in a star configuration, but it is to be noted that the sensor nodes could also be arranged in for example a mesh configuration. In the latter case, typically more time slots are needed within each superframe for each sensor node, especially those sensor nodes that do not have a direct communication link with the gateway; at least one time slot for the ordinary route, one for an alternative route for safety measures, and one for resending the sample, in case the sample was not relayed correctly by a sensor node higher up in the mesh hierarchy.

Methods for allocating time slots for sensor node sample transmission from sensor nodes in a wireless sensor node network will now be described in more detail with reference to FIGS. 3*a-c* and FIG. 4. Since the adaptive allocation of time slots typically occurs in the case of an event/transient which thus influences one or more process variables, only situations when a sample has a value outside an accepted range will be described in what follows. It is thus assumed that a one of the sensor nodes N1, N2, N3, ... Nn, hereinafter termed a first sensor node, has measured a process variable that has values outside an accepted range of values for that process variable.

In a step S1-1 the sample is received by the gateway 7-1 from the first sensor node in a first time slot $T_{s1}$ of a superframe SF1. The sample is sent by the gateway 7-1 to the controller 3. According to one embodiment, the sample may additionally be sent to the network manager 7-2. In the first case, the controller 3 determines that the sample is outside its accepted range of values. In the latter case, the network manager 7-1 determines that the sample is outside its accepted range of values. In the first case, the information that the sample in the first time slot $T_{s1}$ has a value outside its accepted range is provided to the network manager 7-2 via the gateway 7-1.

The network manager 7-2 is arranged to identify a second time slot $T_{s2}$ of the superframe SF1 as being suitable for a further sample to be sent by the first sensor node such that the rate of samples provided to the controller 3 from the first sensor node can be increased. The identification of the second time slot $T_{s2}$ can for example be made by identifying an empty time slot if such a time slot is available in the first portion of superframe SF1 dedicated to sensor node samples. Alternatively, the second time slot $T_{s2}$ may be a time slot in which a second sensor node currently sends samples, but which sample in the second time slot $T_{s2}$ has either been determined to be within an accepted range of values, or if it is determined that the second sensor node monitors a process variable that has slower dynamics than the process variable associated with the first sensor node.

In a step S2 an identification of the second time slot $T_{s2}$ of the superframe is obtained by the gateway 7-2 from the network manager 7-1. The identification can for example be obtained in the form of an updated schedule defining that the second time slot Ts2 is in the following to be used by the first sensor node, i.e. that the first sensor node is to send a further sample in a subsequent superframe in the second time slot $T_{s2}$.

In a step S5 instructions are provided to the first sensor node to send the further sample in the second time slot $T_{s2}$ of a subsequent superframe SF2, SF3.

Figure 3A:
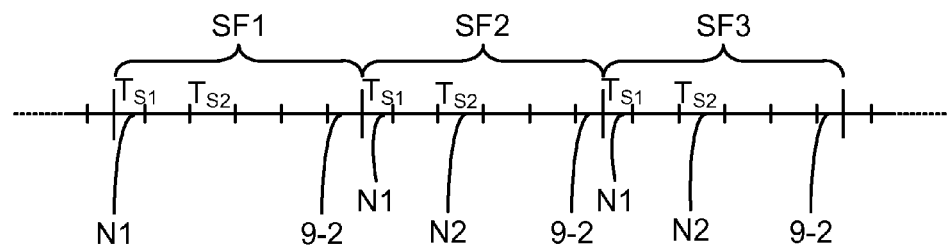
FIGS. 3a-c are examples of time slot allocation in superframes.

A first example in FIG. 3*a* depicts superframe SF1 in which a first sensor node N1 has provided one or more samples having values outside its accepted range of values in a first time slot $T_{s1}$, as determined by the controller 3 and/or the network manager 7-2. It is also determined that a second time slot $T_{s2}$, i.e. time slot three in the superframe SF1 is a suitable time slot in which the first sensor node can send one or more further samples so as to increase the rate of samples provided to the controller 3 to thereby enhance the control of the process variable associated with the first sensor node. Instructions are provided to the first sensor node that it may send samples also in the second time slot $T_{s2}$, i.e. in time slot three. As a result, the first sensor node sends a further sample in subsequent superframes SF1 and SF2 while continuing to send samples in the first time slot $T_{s1}$, i.e. time slot one, of each superframe.

Returning now to FIG. 4, the superframe may comprise a sample from a second sensor node in the second time slot of the superframe, which sample has a value within a range of accepted sample values, i.e. the second time slot may be occupied by a second sensor node. In this case, a general step S1 of receiving comprises the step S1-2 of receiving the sample having a value within an accepted range from the second sensor node. Furthermore, a step S3 of providing instructions to the second sensor node not to send any sample in the second time slot of a subsequent superframe is performed. According to one embodiment, prior to the step S5 of providing instructions to the first sensor node, a confirmation from the second sensor node that it will not send any sample in the second time slot is received in a step S4. Alternatively, when the instructions have been provided in step S3 to the second sensor node not to send any sample in the second time slot of a subsequent superframe, step S5 of providing instructions to the first sensor node may be performed without confirmation from the second sensor node.

The step S3 of providing instructions to the second sensor node not to send any sample in the second time slot of a subsequent superframe is according to one embodiment provided in the portion of a superframe dedicated to send instructions to all of the sensor nodes in the sensor node network of the same superframe in which instructions are provided to the first sensor node to send the further sample in the second time slot.

Figure 3B:
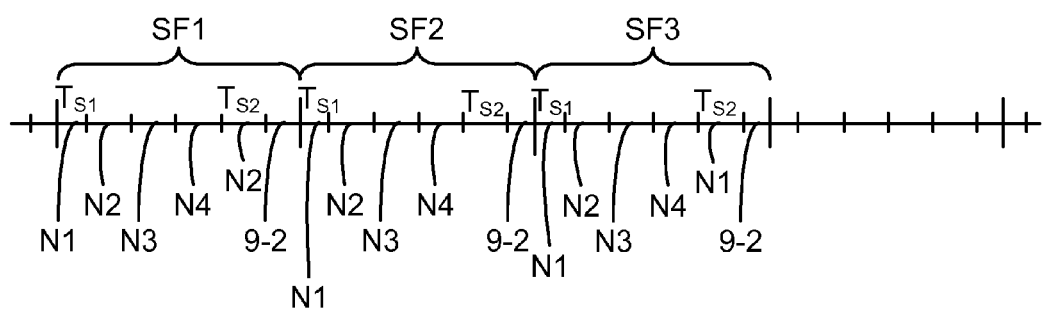
Figure 3C:
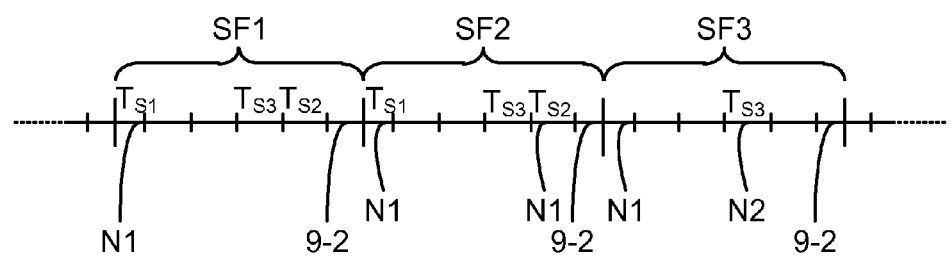
Figure 4:
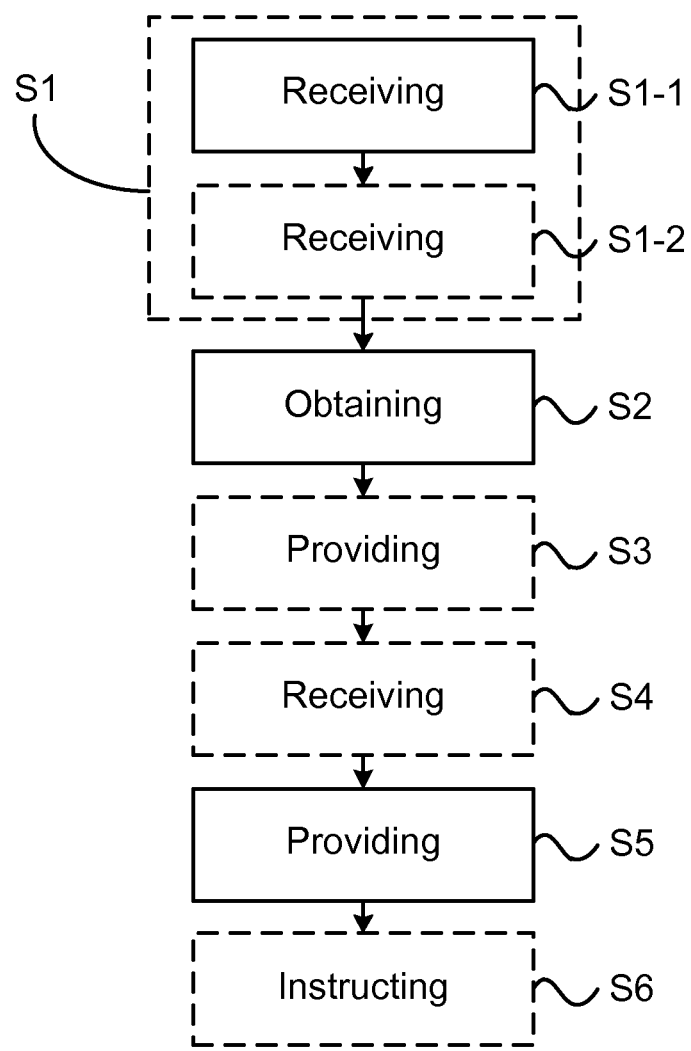
FIG. 4 is a flowchart of a method of allocating time slots for sensor node sample transmission from sensor nodes in a wireless sensor node network.

The step S5 of providing instructions to the first sensor node is according to one embodiment provided in a portion of a superframe dedicated to send instructions to all of the sensor nodes in the sensor node network, as indicated by item 9-2, in the terminology of FIG. 2 the second portion of each superframe, as shown in FIGS. 3*a-c*.

FIG. 3*b* shows a situation in which sensor nodes N1, N2, N3, N4 send samples in time slots one, two, three, and four, respectively. When samples having values outside the accepted range have been sent by a first sensor node N1 in time slot $T_{s1}$, and when a second time slot $T_{s2}$, in which a second sensor node N2 sends samples, is identified as suitable for a further sample to be sent by the first sensor node N1, instructions that the second sensor node N2 is not to send any further samples in the second time slot $T_{s2}$ are provided to the second sensor node N2. Instructions are also provided to the first sensor node N1 to start sending further samples in the second time slot $T_{s2}$ while continuing to send samples in the first time slot $T_{s1}$.

In FIG. 3*c* an example is shown in which a second time slot $T_{s2}$ is a shared time slot for all sensor nodes. Any sensor node may send samples in the second time slot $T_{s2}$ if necessary. Thus, if it is determined that a first sensor node has provided a sample in a first time slot $T_{s1}$, the sample having a value outside a predetermined range of values, a second time slot $T_{s2}$ is identified in the superframe SF1, wherein instructions are sent to the first sensor node in a portion 9-2 of the superframe SF1 dedicated to broadcast to the sensor nodes that it should send a further sample in the second time slot $T_{s2}$. In a subsequent superframe SF2, the first sensor node is in a step S6 instructed by the gateway 7-1 to send the further sample of the second time slot $T_{s2}$ in a third time slot $T_{s3}$ of a subsequent superframe SF3 instead of the second time slot. Thus, the second time slot $T_{s2}$ will again be available for any of the sensor nodes in the sensor node network.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A method of allocating time slots for sensor node sample transmission from sensor nodes in a wireless sensor node network, which wireless sensor node network forms part of a control system for controlling an industrial process, wherein the method comprises the steps of:
receiving a sample of a process variable from a first sensor node in a first time slot of a superframe, which first sample has a value outside an accepted range of values;
receiving, by a gateway, information from a controller or a network manager concerning the need of a higher sample rate from the first sensor node due to the first sample having a value outside the accepted range of values;
obtaining an identification of a second time slot of the superframe in which second time slot the first sensor node is to send a further sample in a subsequent superframe such that the rate of samples provided to the controller from the first sensor node can be increased; and
providing instructions to the first sensor node to send the further sample in the second time slot of a subsequent superframe,
wherein the gateway is arranged to receive the sample and to provide the sample to a controller arranged to control process variables associated with the sensor nodes based on control errors determined by the difference between respective setpoint values and the samples received by the controller.

2. The method as claimed in claim 1, further comprising the step of receiving a sample from a second sensor node in the second time slot of the superframe, which sample has a value within a range of accepted sample values, and providing instructions to the second sensor node not to send any sample in the second time slot of a subsequent superframe.

3. The method as claimed in claim 1, further comprising the step of receiving a sample from a second sensor node in the second time slot of the superframe, wherein the second sensor node monitors a process variable that has slower dynamics than the process variable associated with the first sensor node, and providing instructions to the second sensor node not to send any sample in the second time slot of a subsequent superframe.

4. The method as claimed in claim 2, further comprising the step of, prior to providing instructions to the first sensor node, receiving a confirmation from the second sensor node that it will not send any sample in the second time slot.

5. The method as claimed in claim 1, wherein the step of providing instructions to the first sensor node to send the further sample in the second time slot is provided in a portion of a superframe dedicated to send instructions to all of the sensor nodes in the sensor node network.

6. The method as claimed in claim 5, wherein the step of providing instructions to the second sensor node not to send any sample in the second time slot of a subsequent superframe is provided in the portion of a superframe dedicated to send instructions to all of the sensor nodes in the sensor node network of the same superframe in which instructions are provided to the first sensor node to send the further sample in the second time slot.

7. The method as claimed in claimed in claim 1, further comprising the step of, after the step of providing instructions to the first sensor node, instructing the first sensor node to send the sample value of the second time slot in a third time slot of a subsequent superframe instead of the second time slot.

8. The method as claimed in claim 1, wherein the second time slot is an empty time slot.

9. The method as claimed in claim 1, wherein communication between the gateway and the sensor nodes is provided by means of time-slotted protocol WirelessHART or ISA 100.

10. A computer program embodied on a non-transitory computer readable medium and comprising computer-executable components for causing a device to perform the steps recited in claim 1 when the computer-executable components are run on a processor included in the device.

11. A control system for controlling an industrial process, the control system comprising:
a wireless sensor node network;
a controller; and
a sensor node network interface system, comprising a gateway, for allocating time slots for sensor node sample transmission from sensor nodes in the wireless sensor node network, wherein the sensor node network interface system is arranged to:
receive a sample of a process variable from a first sensor node in a first time slot of a superframe, which first sample has a value outside an accepted range of values;
receive, by the gateway, information from the controller or a network manager concerning the need of a higher sample rate from the first sensor node due to the first sample having a value outside the accepted range of values;
obtain an identification of a second time slot of the superframe in which second time slot the first sensor node is to send a further sample; and
provide instructions to the first sensor node to send the further sample in the second time slot of a subsequent superframe,
wherein the gateway is arranged to receive the sample and to provide the sample to a controller arranged to control process variables associated with the sensor nodes based on control errors determined by the difference between respective setpoint values and the samples received by the controller.

12. The sensor node network interface system as claimed in claim 11, arranged to receive a sample from a second sensor node in the second time slot, which sample has a value within a range of accepted sample values, wherein the sensor node network interface system is arranged to provide instructions to the second sensor node not to send any sample in the second time slot of a subsequent superframe.

13. The sensor node network interface system as claimed in claim 11, arranged to receive a sample from a second sensor node in the second time slot, wherein the second sensor node monitors a process variable that has slower dynamics than the process variable associated with the first sensor node, wherein the sensor node network interface system is arranged to provide instructions to the second sensor node not to send any sample in the second time slot of a subsequent superframe.

14. The sensor node network interface system as claimed in claim 12, arranged to receiving a confirmation from the second sensor node that it will not send any sample in the second time slot of a subsequent superframe prior to providing instructions to the first sensor node.

15. The sensor node network interface system as claimed in claim 11, arranged to provide the instructions to the first sensor node to send the further sample in the second time slot in a portion of a superframe dedicated to send instructions to all of the sensor nodes in the sensor node network.

16. The sensor node network interface system as claimed in claim 11, arranged to instruct the first sensor node to send the further sample of the second time slot in a third time slot of the super frame instead of the second time slot.

17. The sensor node network interface system as claimed in claim 16, wherein the second time slot is an empty time slot.

18. The sensor node network interface system as claimed in claim 11, wherein communication between the gateway and the sensor nodes is provided by means of the time-slotted protocol WirelessHART or ISA 100.

19. The method as claimed in claim 3, further comprising the step of, prior to providing instructions to the first sensor node, receiving a confirmation from the second sensor node that it will not send any sample in the second time slot.

20. The method as claimed in claim 2, wherein the step of providing instructions to the first sensor node to send the further sample in the second time slot is provided in a portion of a superframe dedicated to send instructions to all of the sensor nodes in the sensor node network.

* * * * *